2,745,822
ACRYLONITRILE FIBERS OF IMPROVED DYE SUSCEPTIBILITY

Gerry P. Mack, Jackson Heights, N. Y., assignor, by mesne assignments, to Carlisle Chemical Works, Inc., Reading, Ohio, a corporation of Ohio No Drawing. Application February 10, 1953, Serial No. 336,203

2 Claims. (Cl. 260—83.3)

The invention relates to copolymers of acrylonitrile, and in particular to shaped articles such as films, fibers, and the like, formed from modified acrylonitrile-diene copolymers, which articles show improved dyeing properties.

It is well known that fibers and articles prepared from acrylonitrile polymers cannot be dyed satisfactorily by the standard commercial dyeing methods. Most of these methods do not produce even shades, and these dyeing difficulties have been a serious obstacle to a more general commercial use of these polymers for textile and similar applications.

It has already been proposed to copolymerize acrylonitrile with compounds enhancing the dye receptivity of the obtained structures, particularly with vinyl pyridine and vinyl pyrrolidine. Though these copolymers have considerably better dyeing properties than polyacrylonitrile itself, they are too expensive for many purposes.

It is a principal object of the invention to provide acrylonitrile copolymers with readily available unsaturated compounds, which copolymers have a chemical configuration susceptible to a strong and uniform adsorption of dyestuffs.

Another object of the invention is to provide a method to prepare acrylonitrile fibers having good dyeing properties.

Other objects and advantages will become apparent from a consideration of the specification and claims.

It has been found that acrylonitrile polymer compositions which have free polar groups such as epoxy or hydroxy groups have a dye susceptibility by far superior to the acrylonitrile homo- or copolymers. Particularly suitable are such copolymers which contain as reactive groups only the nitrile group of the acrylonitrile component and said polar groups.

Such polymers can be obtained either by copolymerization of acrylonitrile with organic cmopounds having an aliphatic double bond and an epoxy group, for instance limonene oxide, or by first polymerizing monomeric acrylonitrile with unsaturated polymerizable compounds having two double bonds, particularly with conjugated dienes, and then converting the remaining double bonds of said copolymers to polar groups which are good receptors for dyestuffs.

Suitable dienes are, for instance, butadiene-1,3; 2,3-dimethyl butadiene-1,3; isoprene; 2-methyl pentadiene-1,3; 2,3-dimethyl pentadiene-1,3; or higher dienes. In addition, other copolymerizable ethylenic compounds may be used.

The ratio of acrylonitrile and diene units in the copolymer will depend on the physical shape and properties of the desired end product and its use. In general, the polymer composition should contain at least 80 per cent by weight of acrylonitrile units in the copolymer molecule and between 1 to 20 per cent of the diene component.

The polymerization may be carried out by any of the conventional polymerization procedures, such as, mass, solution, suspension or emulsion polymerization, and the usual catalysts, emulsifiers and other additives may be added. The polymers should have a molecular weight of at least 10,000; the conditions for obtaining such polymers are well known in the art. If the compositions contain relatively high proportions of diene, it is of advantage to add small amounts of antioxidants or inhibitors to prevent crosslinking during polymerization.

According to the invention, the double bonds of the thus obtained copolymers are then, at least partially, converted to epoxy groups, which epoxy groups may be subsequently hydrolyzed to hydroxyl groups in accordance with well known procedures.

The epoxidation is preferably carried out in solution. For instance, the copolymerizates may be dissolved in glacial acetic acid and reacted with peracetic acid under cooling, whereupon the solution is poured into ice water and the precipitated compound washed and dried. This compound has a much higher solubility in acetone than the starting product.

The reactivity and the physical and chemical properties of the modified copolymerization products can be readily controlled by the degree of epoxidation or hydroxylation and by adjusting the conditions of the reaction so that all or only a part of the double bonds are converted to polar groups. They can be worked up by conventional methods to shaped products, such as films, molded articles, tubes, particularly to fibers, yarns, and bristles, which combine the physical properties desirable for fibers with good dye absorption for the various groups of dyestuffs, and which are dyed evenly and in deep shades also by acid dyestuffs.

The dyestuffs may be applied to the unshaped modified copolymerization product but preferably to the shaped products, such as fibers, yarns, skins, or to the fabrics made thereof.

The epoxidated or hydroxylated copolymers of the invention are soluble in the same solvents as acrylonitrile homopolymers and are converted to fibers by the conventional dry or wet spinning processes used for the homopolymers. The obtained fibers show improved affinity to basic, acetate and also acid dyestuffs.

The following example will serve to illustrate a preferred mode of carrying out the invention.

Example 255 g. of acrylonitrile
45 g. of 2-methylpentadiene-1,3
3 g. of ammonium persulfate
1.2 g. of sodium bisulfite
1.5 g. of dodecyl mercaptan were added to 3,000 cc. of water. The air above the batch was replaced by nitrogen and the batch polymerized at 35 to 40° C. for 25 hours in an atmosphere of nitrogen. The unchanged monomer was then distilled out and the copolymer salted out. After washing, it was dried. The copolymer composition consisted of 85% of acrylonitrile and 15% of methyl pentadiene. This polymer was dissolved in formic acid and epoxidized by adding hydrogen peroxide of 50% concentration. The course of the epoxidation was followed by titrating the excess of hydrogen peroxide. After most of the hydrogen peroxide was consumed, the batch was poured in ice water, washed acid free and dried under vacuum.

The obtained copolymer was dissolved in N,N-dimethyl acetamide to an about 8 per cent solution and the solution was extruded through a spinneret into a glycerine coagulating bath at about 70° C.; the threads were stretched and washed in the usual manner, and then dyed in a two per cent solution of methylene blue (goods—liquor ratio 1:100) for 1 hour at 90° C. A deep and even shade was produced whereas the unepoxidized polymer treated under the same conditions showed only a light tint.

Similar results were obtained with acid and cellulose acetate dyestuffs.

Not only fibers, filaments and threads can be dyed in the described manner; the method can be applied in the same way to films and other structures made of the defined copolymers.

Though I prefer to epoxidize first the acrylonitrile-diene copolymer and then to form it to the desired shape, it is also possible to prepare first fibers or films from the copolymer and then to epoxidize and dye the shaped structure.

As the invention is susceptible of various modification without departing from the spirit and scope thereof, it is to be understood that my invention is not to be limited except as defined in the appended claims.

What I claim is:

1. A process of preparing a copolymer of acrylonitrile suitable for spinning fibers having improved dye susceptibility comprising reacting 80 to 99 parts of acrylonitrile with 20 to 1 parts of a conjugated diene and subsequently epoxidizing at least part of the double bond of the copolymerization product.

2. A process of preparing a copolymer of acrylonitrile suitable for spinning fibers having improved dye susceptibility comprising reacting 80 to 99 parts of acrylonitrile with 20 to 1 parts of a conjugated diene, epoxidizing at least part of the double bonds of the copolymerization product, and finally hydroxylating the epoxide groups of the compound.

References Cited in the file of this patent

UNITED STATES PATENTS

| | | |
|---|---|---|
| 2,332,899 | D'Alelio | Oct. 26, 1943 |
| 2,450,234 | Evans | Sept. 28, 1948 |
| 2,570,601 | Schmerling | Oct. 9, 1951 |

OTHER REFERENCES

Smyth Dielectric Constant and Molecular Structure (1931), pages 193–199.